(12) United States Patent
Lin et al.

(10) Patent No.: US 8,062,397 B2
(45) Date of Patent: Nov. 22, 2011

(54) AIR FILTRATION APPARATUS

(75) Inventors: Jhun Lin, Novi, MI (US); Mark Edward Hipp, South Lyon, MI (US); Jerome George Wiencek, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 397 days.

(21) Appl. No.: 12/469,709

(22) Filed: May 21, 2009

(65) Prior Publication Data
US 2010/0293904 A1 Nov. 25, 2010

(51) Int. Cl.
*B01D 50/00* (2006.01)
(52) U.S. Cl. .............. 55/320; 55/385.3; 55/486; 55/495
(58) Field of Classification Search .................... 55/320, 55/321, 325, 385.3, 445, 446, 486, 495
See application file for complete search history.

(56) References Cited

U.S. PATENT DOCUMENTS

| | | |
|---|---|---|
| 4,693,393 A | 9/1987 | DeMinco et al. |
| 5,024,687 A | 6/1991 | Waller |
| 5,058,693 A | 10/1991 | Murdock et al. |
| 5,149,347 A | 9/1992 | Turner et al. |
| 5,501,198 A | 3/1996 | Koyama |
| 5,638,786 A | 6/1997 | Gimby |
| 5,912,368 A | 6/1999 | Satarino et al. |
| 6,797,024 B2 * | 9/2004 | Inoue .............................. 55/319 |
| 7,013,878 B1 | 3/2006 | Cotton et al. |
| 7,201,155 B2 | 4/2007 | Mills |
| 7,210,466 B1 | 5/2007 | Roche |
| 7,250,387 B2 | 7/2007 | Durante et al. |
| 2007/0056589 A1 | 3/2007 | Capon et al. |
| 2007/0107702 A1 | 5/2007 | King |
| 2008/0006248 A1 | 1/2008 | Rockwell et al. |

FOREIGN PATENT DOCUMENTS

| | | |
|---|---|---|
| EP | 0 947 366 | 10/1999 |
| WO | WO 2007/087102 | 8/2007 |

* cited by examiner

*Primary Examiner* — Robert A Hopkins

(57) ABSTRACT

An air filter assembly for an evaporative emissions control canister used with an internal combustion engine fuel system. The assembly includes: a housing having: an air inlet formed in an upper portion of the housing; and an air outlet; and; a baffle disposed within the housing. The baffle extends vertically downward from the air inlet in the upper portion of the housing towards a bottom portion of the housing. The baffles forming a plurality of vertically extending channels interconnected through a horizontally interconnecting channel formed between a bottom edge of the baffle and the bottom portion of the housing. A first one of the vertically extending channel receives air entering the housing from the air inlet. The air passes downwardly in the first one of the channels, then passing laterally outwards through the horizontally interconnecting channel towards sidewalls of the housing, then passing upwardly through a second one of the vertically extending channels, and then finally exiting the housing through the air outlet. A filter structure is disposed in the second one of the vertically extending channels.

4 Claims, 7 Drawing Sheets

AIR FILTRATION APPARATUS

TECHNICAL FIELD

This disclosure relates generally to air filtration apparatus and more particularly to air filtration apparatus for use with fuel vapor recovery system. Still more particularly, the disclosure relates to an air filter for an automotive vehicle fuel vapor recovery system, which includes structures for gradually separating unwanted particles of dust, moisture, soot, and the like from the vapor recovery system purge air stream.

BACKGROUND

As is known in the art, Conventional fuel vapor recovery systems used in automotive vehicles typically include a carbon canister used to recover excess fuel vapor generated in the fuel tank. Activated carbon in the carbon canister adsorbs the fuel vapor and temporarily retains the vapor until the canister is purged. During vehicle operation, at times determined by programmed vehicle calibration, the fuel vapor adsorbed by the activated carbon is desorbed by introducing outside air, or purge air, to the canister. The fuel vapor thus desorbed is fed to the engine for utilization in combustion.

More particularly, automotive internal combustion engines utilize a carbon canister connected to the fuel tank to collect fuel vapors from the fuel tank as the tank is being refilled, or when the vehicle is parked. The canister connected to the engine also allows the vapor stored within the canister to be pulled to the engine for burning during the "purge" cleansing process. Filtered fresh air is necessary for the purging process so that environmental contaminates do not eventually plug the carbon bed or damage some valves which may lead to the generation of On Board Diagnostic (OBD-II) detection faults. An air filtering apparatus with a built-in Canister Vent Valve (CVV) can become an important design element assuring the supply of this clean air.

Filtering of-purge air introduced to a vapor recovery system to purge the carbon canister is not new. For the mentioned purpose, prior art examples teach the use of one or more assemblies comprising either a filter medium, baffle means, or both. More particularly, U.S. Pat. No. 5,058,693 to Murdock et al, U.S. Pat. No. 5,024,687 to Waller, and U.S. Pat. No. 5,638,786 to Gimby each disclose a remote fuel vapor recovery system filter assembly comprising the combination of baffle and filter element means. Both '693 and '687 include simple baffle means comprising no more than two independent baffle entities. The present disclosure discloses a plurality of mating and nonmating planar baffles, the increased complexity of which is matched by increased functional efficiency. Patent '768 provides a self-cleaning air filter comprising a filter element of various embodiments. In each embodiment, this mentioned element, so that it may be cleaned by the disclosure's filter cleaning member, is apparently a thin, firm, screen-like entity, and the filter includes provisions for function upon "occlusion" of this element. The present disclosure is comprised of a robust and hearty (thick, wide and tall) filter element and a baffle area, and has been proven to be able to last the average lifetime usage of vehicles (approximately 150,000 miles) without any cleaning.

There are two primary and novel factors contributing to the long-lasting functionality of our disclosure. The first is found in the design of the baffle section. The plurality of baffles are designed such that the particles, having wide size and inertial distributions, are dislodged from the air stream as it travels from inlet towards the filter section. This occurs due to decreased baffle spacing between baffles and the corresponding increase in mobility demand placed on the air flow. The second primary and novel quality of our disclosure is found in the implementation of a filter element so that the smallest particles (those that survive the baffle section) are generally lodged in the upper half of the filter element and eventually, due to gravity, vibration, etc., will migrate to the lower portions of the element. This occurrence will ensure the thorough cleaning of the air and the long-lasting function of the air filter assembly.

U.S. Pat. No. 4,693,393 to DeMinco et al and U.S. Pat. No. 5,501,198 to Korama disclose examples of filtering systems integrally combined within a carbon canister by comprising only baffle means and only filter element means, respectively. U.S. Pat. No. 5,149,347 to Turner et al also discloses a separator device comprising only a baffle section, which is remotely connected to the carbon canister. It is apparent that any structure comprising only baffle means or only filter means will not be as effective and robust as the present disclosure comprising both baffle and particulate filter means.

U.S. Pat. No. 5,912,368 to Satarino et al., describes a filter that both graduated baffle separation means and filter element means are included in a filter assembly. This assures a maximum degree of separation of particles, foreign matter, such as soot and road dust, moisture, and the like from the fresh air therein otherwise present.

SUMMARY

In accordance with the present disclosure, an air filter assembly is provided for an evaporative emissions control canister used with an internal combustion engine fuel system. The assembly includes: a housing having: an air inlet formed in an upper portion of the housing; and an air outlet; and; a baffle disposed within the housing. The baffle extends vertically downward from the air inlet in the upper portion of the housing towards a bottom portion of the housing. The baffles forming a plurality of vertically extending channels interconnected through a horizontally interconnecting channel formed between a bottom edge of the baffle and the bottom portion of the housing. A first one of the vertically extending channel receives air entering the housing from the air inlet. The air passes downwardly in the first one of the channels, then passing laterally outwards through the horizontally interconnecting channel towards a sidewalls of the housing, then passing upwardly through a second one of the vertically extending channels, and then finally exiting the housing through the air outlet. A filter structure is disposed in the second one of the vertically extending channels.

In one embodiment, the filter structure is disposed adjacent the upper portion of the housing.

In one embodiment, the air outlet is disposed between the upper portion of the housing and a first portion of a sidewall of the housing.

In one embodiment, the second one of the vertically extending channels has a first portion disposed between a first surface portion of the baffle and a first sidewall portion of the outlet. The first sidewall portion of the outlet is disposed within the housing. The second one of the vertically extending channels has a second portion disposed between a second surface portion of the baffle and a second sidewall portion of the housing.

In one embodiment, a first portion of the filter structure includes: a first filter member having: a first portion disposed between the first surface portion of the baffle and the first sidewall portion of the outlet; and a second portion disposed between the second portion of the baffle and a space between a lateral edge of the first filter element and the second sidewall portion of the housing.

In one embodiment, the filter structure includes a second filter member disposed above the first filter member. The second filter member has: a first portion disposed between the first surface portion of the baffle and a second surface portion of the outlet; and a second portion extending between the second surface portion of the baffle and the second sidewall portion of the housing and over the space between the lateral edge of the first filter element and the second sidewall portion of the housing.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
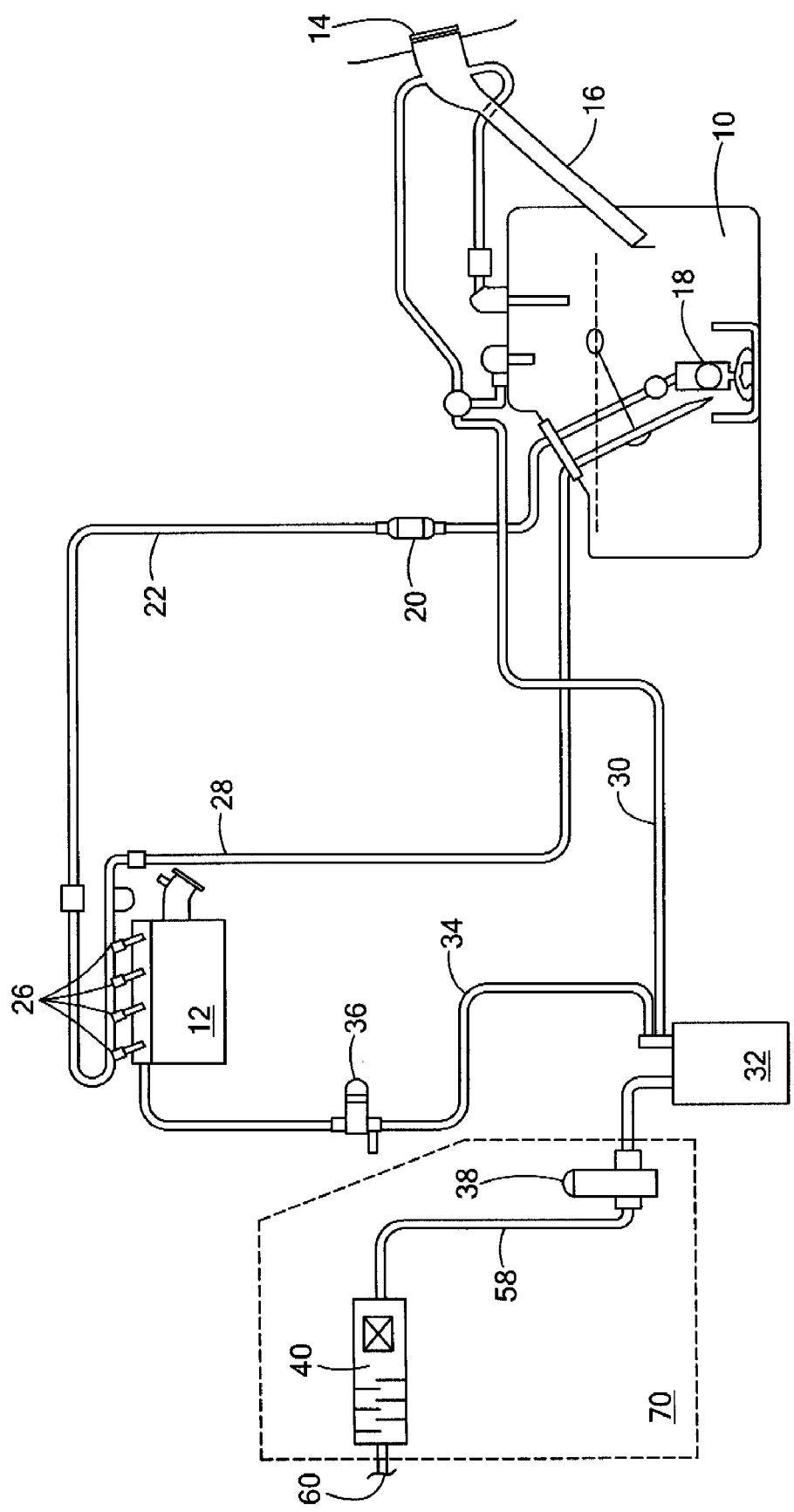
FIG. 1 is a schematic diagram of an automotive evaporation system having a fuel vapor recovery system utilizing an air filter assembly according to the disclosure.
Figure 2:
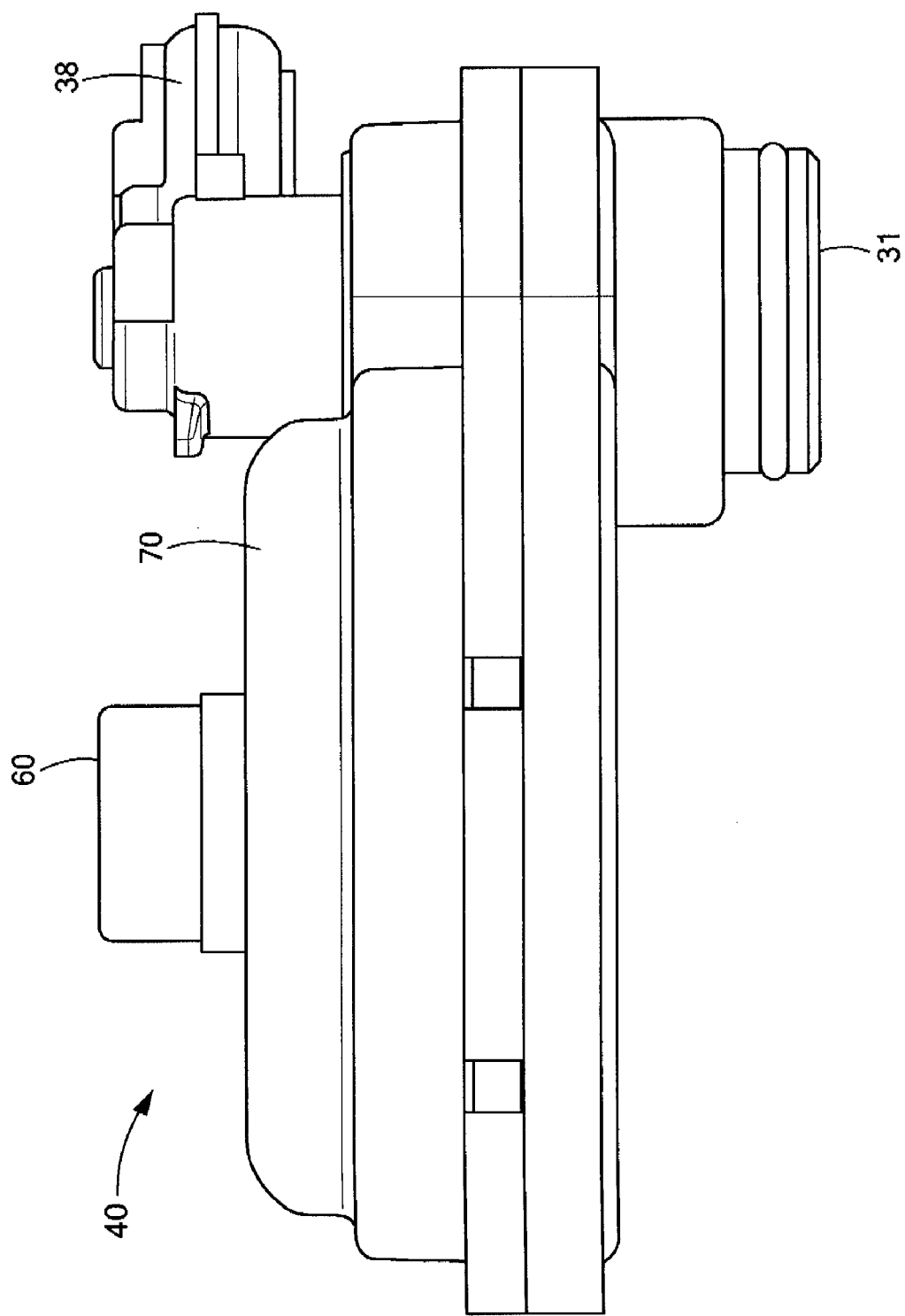
FIG. 2 is a side elevation view of the air filter assembly used in FIG. 1 according to the disclosure.
Figure 3:
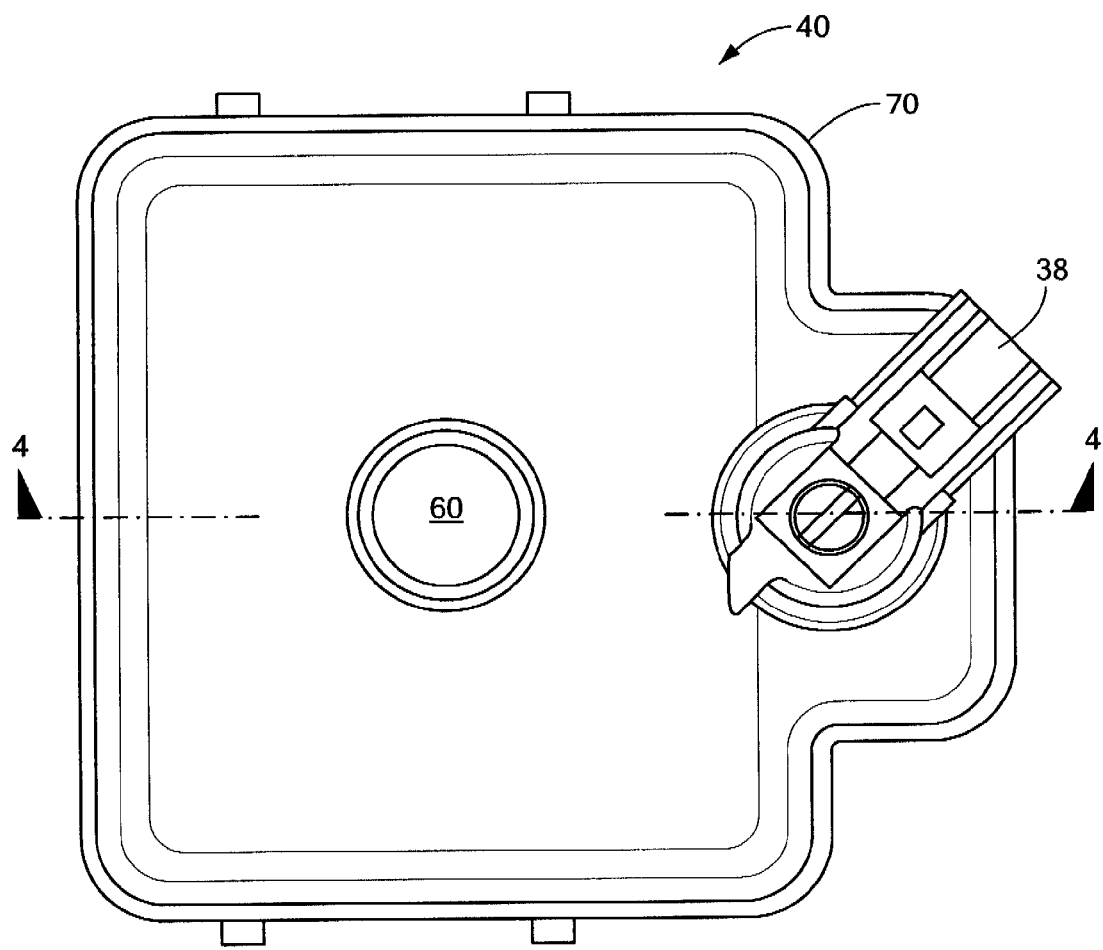
FIG. 3 is a top view of the air filter assembly used in FIG. 1 according to the disclosure.

FIG. 1 shows an automotive evaporative emission system having a fuel vapor storage system (FVSS) integrally disposed therein. Although some of the automotive evaporative emission system's specific, geometry, and component names may differ from vehicle to vehicle, the primary structure and structural components will remain constant.

Primary components of automotive evaporative emission system are fuel tank 10 and internal combustion engine 12. Liquid fuel enters the vehicle by first being introduced to the fuel inlet opening 14 then traveling through fuel filler tube 16 into fuel tank 10. Fuel is sent by fuel pump 18 through fuel filter 20 and to engine 12 by way of fuel line 22, fuel rail 24, and fuel injectors 26. Optionally, some systems will recycle fuel unused by engine 12 by sending it back to fuel tank 10 via the fuel return line 28.

There are generally two primary circumstances wherein fuel vapor filled air is forced out of fuel tank 10. The first circumstance is during the above outlined filling of tank 10 and the other occurs when the fuel vapor in the tank expands (usually due to increased temperature of the fuel and/or fuel vapor) and forces some of the fuel vapor out of the tank. In either case, the fuel vapor filled air is sent through fuel recovery line 30 to carbon canister 32 where it is cleaned of its vapor before being sent to the atmosphere. Carbon canister 32 is filled with activated carbon which adsorbs the fuel vapor from the air flow.

Periodically, carbon canister 32, after absorbing and cleaning the fuel vapor filled air, must be desorbed, or purged, of the fuel vapor therein. This refreshing is done so that the canister can accommodate and absorb additional fuel vapor from fuel tank 10.

Atmospheric air, to be used as purge air, is forced into and out of canister 32 and then sent through vapor purge line 34, and canister purge valve 36, directly to engine 12 for utilization.

As mentioned above, the outdoor air used as purge air must be cleaned of substantially all matter before it is introduced to canister vent valve 38 (CVV) and carbon canister 32. This is the purpose of the air filter assembly 40 contained along with the CVV 38 in a housing 70.

Figure 4:
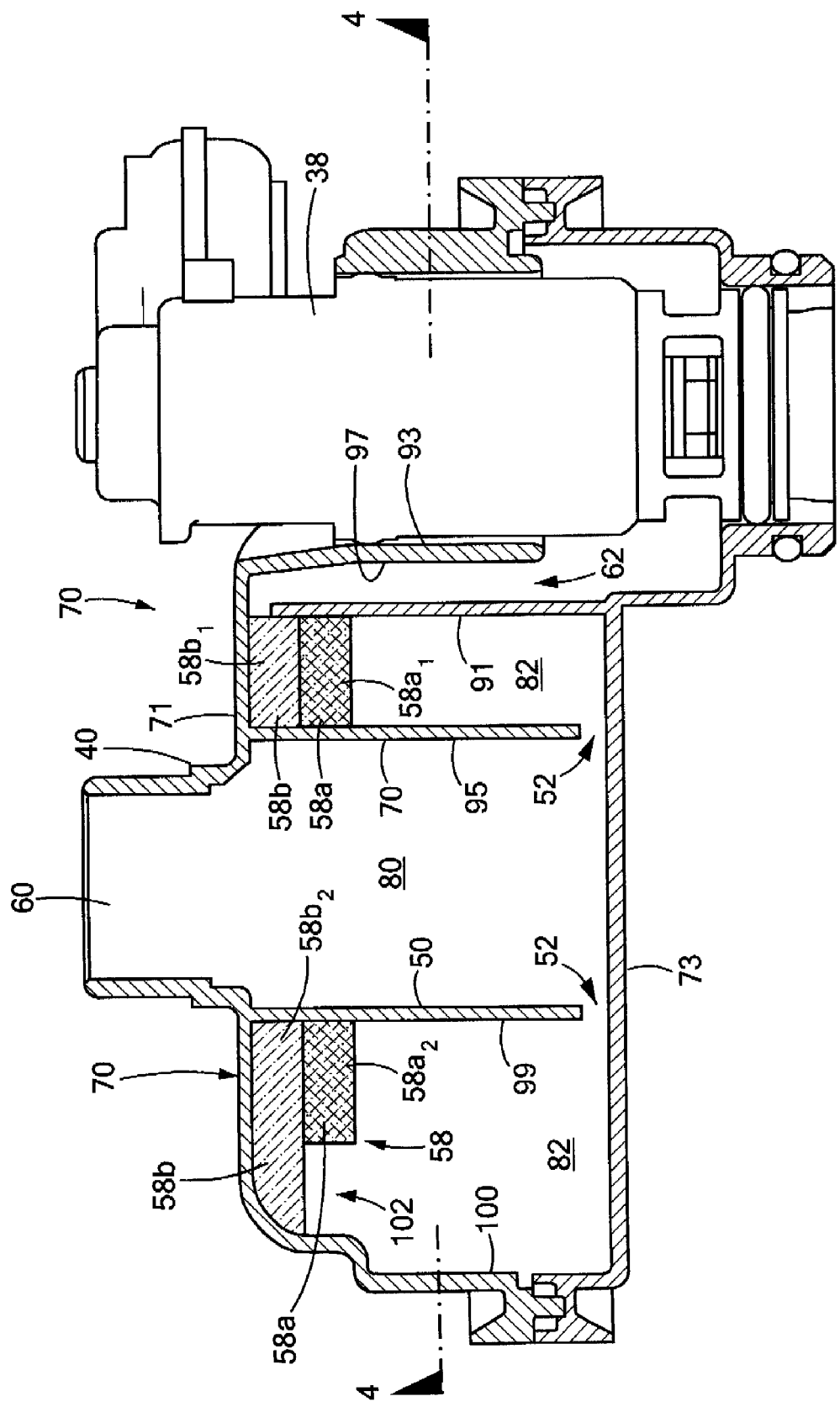
FIG. 4 is a cross sectional view of the air filter assembly used in FIG. 1 according to the disclosure, such cross section being taken along line 4-4 in FIG. 3 according to the disclosure.
Figure 4A:
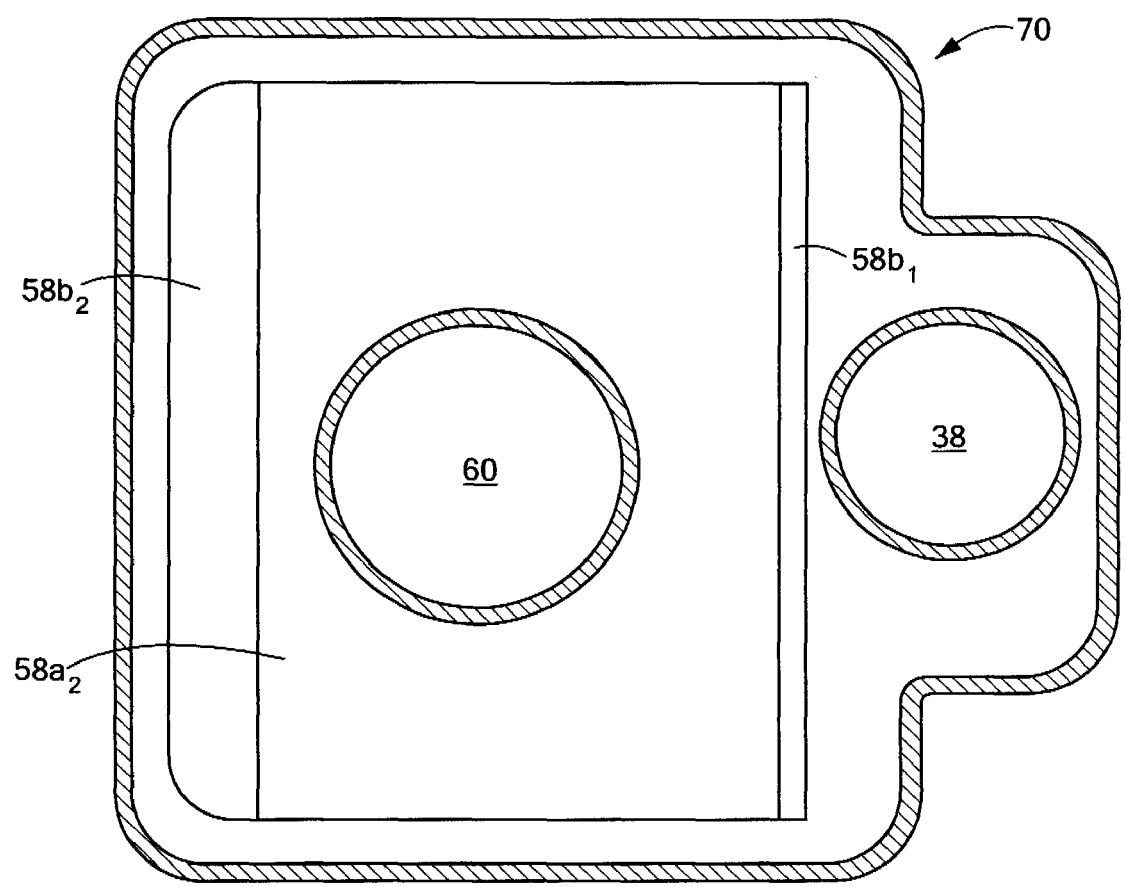
FIG. 4A is a cross sectional view of the air filter assembly used in FIG. 1 according to the disclosure, such cross section being taken along line 4A-4A in FIG. 4 according to the disclosure.

The preferred design of the air filter assembly 40 is best viewed in FIGS. 2-5. Briefly, the air filter assembly 40 has integrated mounting features that enable the assembly to be installed directly to the carbon canister 32. Further, the air filter assembly 40 includes therein the canister vent valve (CVV) 38 in addition to a circularly baffles 50 (FIG. 4) and a filter structure 58 (FIGS. 4, 4A). An inlet air port 60 is provided for incoming fresh air and an outlet port 62 (FIG. 4) is provided and coupled to the CVV 38, as indicated n FIG. 1. It is noted that the CVV 38 may be a built-in or plug in part of the housing 70. The valve 38 may be an electrical, mechanical, pneumatic or other device to allow the opening/closing of the flow path by microcontroller, not shown.

More particularly, the baffle 50 is a hollow tube-like structure, here for example, a circular tube-like structure, extends vertically downward from the air inlet 60 in the upper portion 71 of the housing 70 towards, but short of by about 5 to 10 mm, a bottom portion 73 of the housing 70, to thereby form a gap or horizontal channel 52 adjacent to bottom portion 73 of the housing 70. The baffle 50 forms a plurality of, here two, vertically extending channels 80, 82 interconnected through the horizontally interconnecting channel 52 formed between a bottom edge of the baffle 50 and the bottom portion 73 of the housing 70. A first one of the vertically extending channels, here channel 50, receives air entering the housing 70 from the air inlet 60. The air passes downwardly in the first one of the channels 80 (FIG. 5), then passing laterally outwards through the horizontally interconnecting channel 52 towards sidewalls 90 of the housing 70, then passing upwardly through a second one of the vertically extending channels, here channel 82 and then finally exiting the housing 70 through the air outlet 62.

It is noted that the filter structure 58 is disposed in the second one of the vertically extending channels. Further, it is noted that the filter structure 58 is disposed adjacent the upper portion 71 of the housing 70. Still further, it is noted that the air outlet 62 is disposed between the upper portion 71 of the housing and a first portion 93 of a sidewall of the housing 70 and a second wall portion 97. The second one of the vertically extending channels 82 has a first portion disposed between a first surface portion 95 of the baffle 50 and a first sidewall portion 91 of the outlet 62. The first sidewall portion 91 of the outlet 62 is disposed within the housing 70. The second one of the vertically extending channels 82 has a second portion disposed between a second surface portion 99 of the baffle and a second sidewall portion 100 of the housing 70.

A first portion 58*a* of the filter structure 58 (FIG. 4, 4A) includes: a first filter member having: a first portion 58*a*$_1$ disposed between the first surface portion 95 of the baffle 50 and the first sidewall portion 91 of the outlet 62; and a second portion 58*a*$_2$ disposed between the second portion 99 of the baffle 50 and a space 102 between a lateral edge of the first filter element 58*a* and the second sidewall portion 100 of the housing 70. The filter structure 58 includes a second filter member 58*b* disposed above the first filter member 58*a*. The first filter member 58*b* has a greater porosity than the porosity of filter member 58*a*. The second filter element 58*b* has: a first portion 58*b*$_1$ disposed between the first surface portion 95 of the baffle 50 and a second surface portion 91 of the outlet 62; and a second portion 58*b*$_2$ extending between the second surface portion 99 of the baffle 50 and the second sidewall portion 100 of the housing 70 and over the space 102 between the lateral edge of the first filter element 58*a* and the second sidewall portion 100 of the housing 70.

Figure 5:
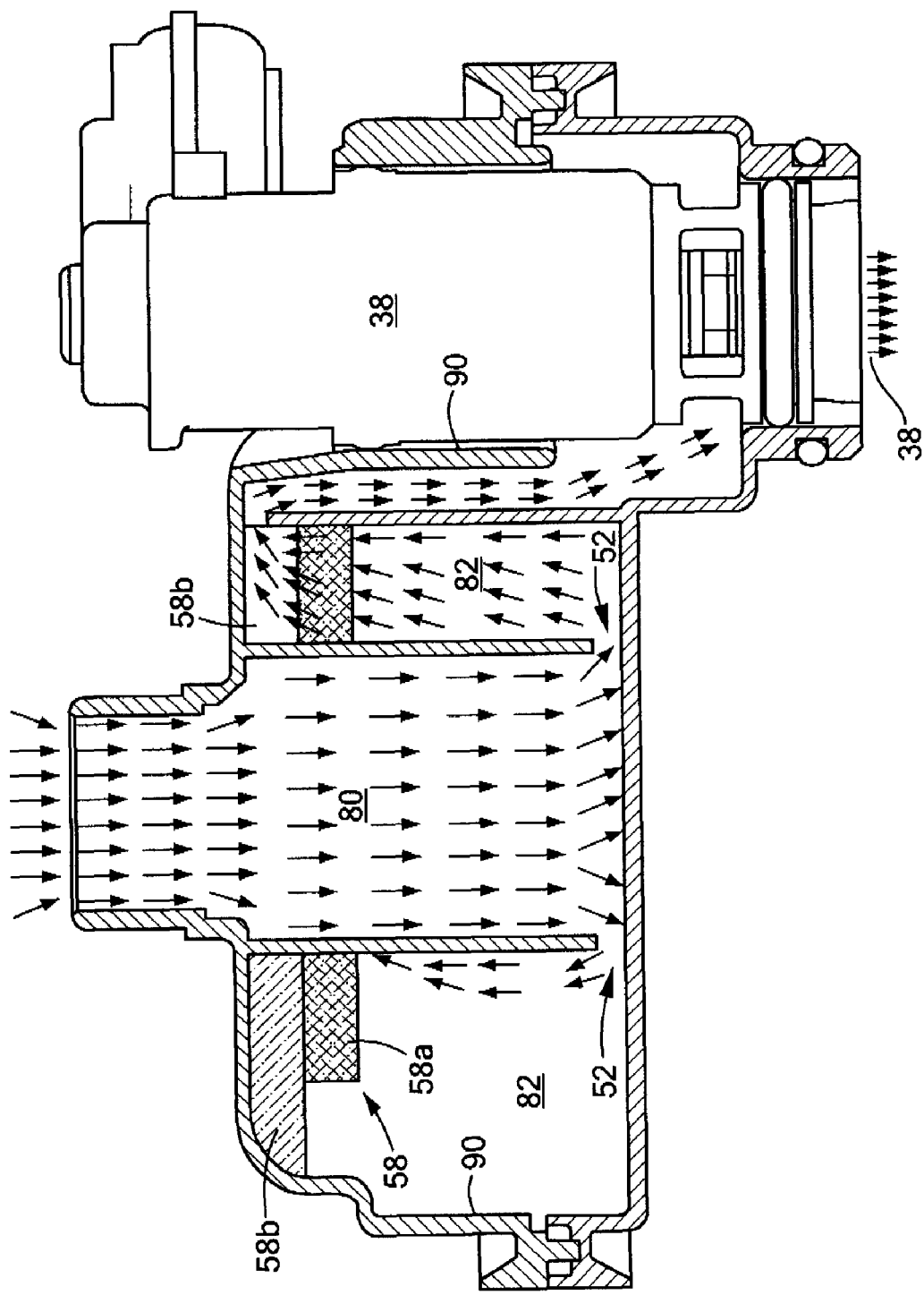
FIG. 5 is a cross sectional view of the air filter assembly used in FIG. 1 according to the disclosure, such cross section being taken along line 4-4 in FIG. 3 as in FIG. 4, here showing with arrows the flow of air though the air filter assembly during an early stage in the filtration according to the disclosure.
Figure 6:
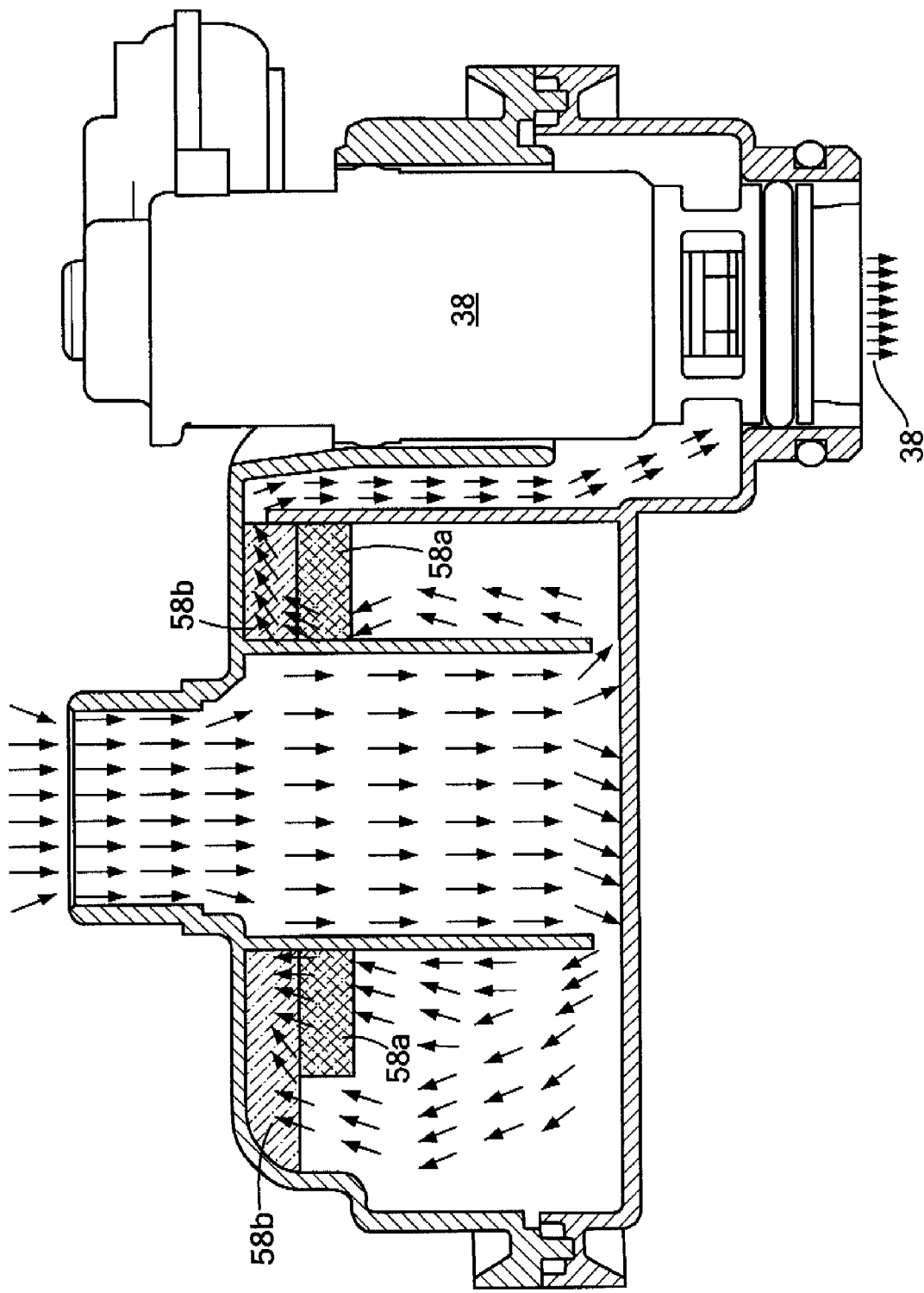
FIG. 6 is a cross sectional view of the air filter assembly used in FIG. 1 according to the disclosure, such cross section being taken along line 4-4 in FIG. 3 as in FIG. 4, here showing with arrows the flow of air though the air filter assembly during a later stage in the filtration according to the disclosure.

The new filtration design provides effective filtration in various orientations and limits flow restrictions during dust ingestion. The filtration strategy has three steps. First, the circular baffle 50 guides the outside air from the vent inlet port 60 to impinge against the bottom surface of the filter structure 58 as shown in FIG. 5, and change the air flow direction abruptly as the air passes though the horizontal channel 52 to reduce the velocity of the air. This helps block some dust in the air. Second, two layers of filter structure 58, i.e., filter member 58*a* and filter member 58*b*, with different density (i.e., porosity) slows down the air flow rate and filters more dust to allow clean air to passes through the filter structure 58. The upper filter member 58*b* is less dense than the lower filter member 58*a*. In the early stage of the filtration apparatus, the air flow pattern is attracted to the open access of the straight baffle 50, as shown in FIG. 5. After the dust gradually being caught by the portion of the lower filter member 58*a*, such lower filter member 58*a* closes to the open access and therefore the flow becomes more restrictive. The flow pattern will be shifted to other (i.e., outer) side of the filter 58, as shown in FIG. 6, in the late stage of the filtration. Third, the straight baffle 50 makes the air flow changing direction abruptly to reduce the velocity of the air, as shown in FIGS. 5 and 6.

In addition to the filtration function, the filtration device also reduces the complexity. The baffle 50 is molded directly in the filter structure 58. The mold-in mounting features are for installing the filter device into the canister directly; and built-in CVV for Vehicle is for the vehicle OBDII leak check function. Therefore, it reduces the complexity of parts. The filters 58*a*, 58*b* may be supported within the housing 70 by any convenient means such as by thin posts (not shown) projecting into the surface of the filter 58*a* from the bottom housing while the circular tube constrains the lateral motion of the filters 58*a*, 58*b*.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. An air filter assembly for an evaporative emissions control canister used with an internal combustion engine fuel system, comprising:
    a housing having: an air inlet formed in an upper portion of the housing; and an air outlet;
    a baffle disposed within the housing, such baffle extending vertically downward from the air inlet in the upper portion of the housing towards a bottom portion of the housing, such baffle forming a plurality of vertically extending channels interconnected through a horizontally interconnecting channel formed between a bottom edge of the baffle and the bottom portion of the housing, a first one of the vertically extending channel receiving air entering the housing from the air inlet, such air passing downwardly in the first one of the channels, then passing laterally outwards through the horizontally interconnecting channel towards a sidewalls of the housing, then passing upwardly through a second one of the vertically extending channels, and then finally exiting the housing through the air outlet; and
    a filter structure disposed in the second one of the vertically extending channels, such filter structure comprising:
        a first filter structure having an edge laterally spaced from an adjacent portion of the sidewall of the housing to provide a space between the edge of the first filter and the adjacent portion of the housing; and
        a second filter disposed between the first filter and the upper portion of the housing, the second filter having a bottom surface portion extending across the space between the edge of the first filter and the adjacent portion of the housing.

2. The air filter assembly recited in claim 1 where the filter structure is disposed adjacent the upper portion of the housing.

3. The air filter assembly recited in claim 2 wherein the air outlet is disposed between the upper portion of the housing and a first portion of a sidewall of the housing.

4. The filter assembly recited in claim 3 wherein the second one of the vertically extending channels has a first portion disposed between a first surface portion of the baffle and a first sidewall portion of the outlet, such first sidewall portion of the outlet being disposed within the housing, and wherein the second one of the vertically extending channels has a second portion disposed between a second surface portion of the baffle and a second sidewall portion of the housing.

* * * * *